United States Patent

[11] 3,607,045

| [72] | Inventors | Thomas D. Wheelock;<br>David R. Boyland, both of Ames, Iowa |
|---|---|---|
| [21] | Appl. No. | 872,120 |
| [22] | Filed | Oct. 29, 1969 |
| [45] | Patented | Sept. 21, 1971 |
| [73] | Assignee | Iowa State University Research Foundation Inc.<br>Ames, Iowa |

[54] PROCESS FOR HIGH TEMPERATURE GASEOUS REDUCTION OF CALCIUM SULFATE
11 Claims, 3 Drawing Figs.

[52] U.S. Cl. .................................................. 23/186, 23/177 R
[51] Int. Cl. ...................................................... C04b 1/04, C01b 17/48
[50] Field of Search ........................................... 23/186, 177

[56] References Cited
UNITED STATES PATENTS

| 1,845,744 | 2/1932 | Fleck ........................... | 23/186 |
| 2,232,099 | 2/1941 | deJahn ....................... | 23/186 X |

Primary Examiner—Oscar R. Vertiz
Assistant Examiner—G. Alvaro
Attorney—Dawson, Tilton, Fallon & Lungmus ABSTRACT: Calcium sulfate is subjected to gaseous reduction at a high temperature to obtain an $SO_2$ containing gas product and a CaO solid product. The reduction is carried out in a fluidized reaction bed by flowing proportioned air and natural gas into and through the bed to fluidize the finely divided calcium sulfate and to heat to reaction temperatures. The natural gas is only partially burned within the bed, thereby also producing reducing quantities of CO and $H_2$. In a preferred embodiment, the calcium sulfate feed is preheated by direct contact with the gas product to recover part of the heat therefrom, and the gas product of reduced heat content is then subjected to indirect countercurrent heat exchange with the air being supplied to the reaction bed.

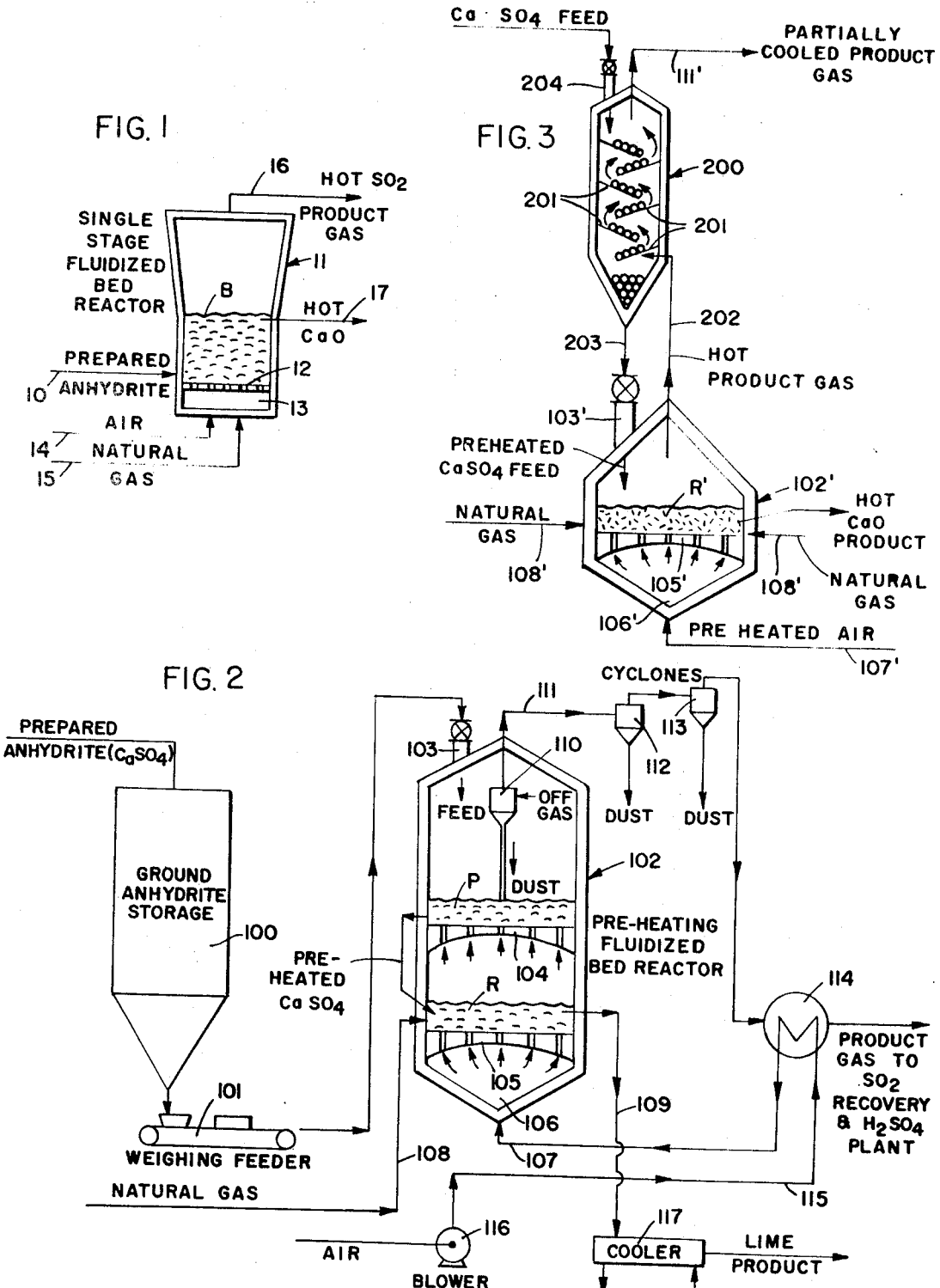

PROCESS FOR HIGH TEMPERATURE GASEOUS REDUCTION OF CALCIUM SULFATE

BACKGROUND AND SUMMARY

Our two prior U.S. Pat. No. 3,087,790 and 3,260,035 disclose a process for the reductive decomposition of calcium s...¹ate, and a method for recovering the sulfur dioxide from the gas product. Gypsum ($CaSO_2 \cdot 2H_2O$) or anhydrite ($CaSO_4$) may be used as the feed, although anhydrite is preferred, and lime (CaO) is produced as a byproduct. While the process has many attractive features, further investigations with respect thereto have shown that the required high reaction temperatures (viz 2,150°–2,250° F.) create design and operational problems.

Instead of utilizing a plurality of separate fluidized reaction beds as disclosed in our prior patents, we now believe that greater economies and efficiencies can be obtained by utilizing a single fluidized bed. Further, it is then practical and advantageous to simultaneously heat the reaction bed and to provide the required reducing gas by in situ partial combustion of natural gas to provide a hot reducing gas. To accomplish this, a carefully proportioned mixture of air and natural gas are supplied to the fluidized bed, with or without premixing, by without any precombustion. The mixture burns within the bed to produce sufficient heat to maintain the required reaction temperature, and at the same time provides the CO and $H_2$ reducing gas.

The advantages of the single reaction bed in situ process are further enhanced where the calcium sulfate feed to the bed, and/or the combustion air are preheated by contact with the hot gas product from the bed. In a preferred embodiment, the hot product gas is first directly contacted with the incoming finely divided calcium sulfate, preferably countercurrently, and thereafter the product gas of substantially reduced temperature is subjected to indirect countercurrent heat exchange with the incoming combustion air. This sequence of steps not only provides for maximum heat recovery, but has important operational and equipment advantages, which were not appreciated prior to the present invention. The amount of fuel (e.g., natural gas) for the process can be reduced by as much as 35 to 45 percent, and the concentration of sulfur dioxide in the product gas substantially increased. For example, the mole percent of $SO_2$ in the product gas can be increased to at least 8 percent, and under optimum conditions, concentrations in excess of 10 percent can be attained. Another important advantage is that the fluidized bed reactor for processing a given quantity of calcium sulfate feed per day can be designed with a substantially smaller diameter, thereby substantially reducing its manufacturing and installation costs. A still further advantage is that optimum heat recovery is feasible while using heat exchangers equipped with conventional-type metal tubes. Where the product gas temperature is first reduced by heat exchange with the calcium sulfate feed, the maximum tube wall temperature of the gas-air heat exchanger can be kept below 1,500° F., thereby making it feasible to utilize relatively conventional metals, such as standard types of stainless steel

THE DRAWINGS

Certain features of this invention are shown in illustrative flowsheet embodiments in the accompanying drawing, wherein --

FIG. 1 is a simplified flow sheet illustrating the single bed in situ features of the present invention;

FIG. 2 is a detailed flow sheet illustrating an embodiment of the present invention; and FIG. 3 is a partial flow sheet illustrating a modification of the feed preheating procedure of FIG. 2.

DETAILED DESCRIPTION

The present invention represents an improvement on the processes described in our prior U.S. Pat. No. 3,087,790 and 3,260,035. Consequently, the disclosures of these patents are incorporated herein by reference.

In practicing the present invention, the feed is preferably a calcium sulfate anhydrite mineral, or a mixture of anhydrite and gypsum. However, as described in the above-cited patents, gypsum feeds can also be utilized. The calcium sulfate feed is prepared by crushing, grinding and screening to produce a finely divided feed of relatively uniform mesh size, such as −6 to +65 mesh (Tyler Standard Screen).

The feed is supplied to a fluidized bed reactor providing a single reaction bed. As is subsequently described, the reactor may contain another fluidized bed for the purpose of preheating the calcium sulfate, but it will usually not be desirable to employ more than a single reaction bed. For greater capacity plant operation, it is preferred to employ a plurality of separate reactors.

It will be understood that the reactor bed will be designed in accordance with well known principles so that the bed of finely divided calcium sulfate is capable of being fluidized by a fluidizing gas mixture. In accordance with the present invention, the gas mixture consists of unburned natural gas mixed proportionately with air so that there is a deficiency of oxygen for complete combustion of the natural gas. Usually on a $CH_4$ basis, it will not be desirable to employ more than 1.8 moles of $O_2$ per mole of C in the natural gas, but usually at least about 1.3 moles $O_2$ per mole of C will be needed. In general, it is desired to control the combustion to maximize the sulfur dioxide in the off-gas while at the same time avoiding any substantial amounts of incompletely oxidized sulfur products, such as free sulfur, hydrogen sulfide, or carbonyl sulfide. The partial combustion within the bed should produce sufficient reducing agents (CO and $H_2$) for the desired reduction, while avoiding any large excess in the off-gas. The process is considered feasible when the product gas contains at least 5– 6 mole percent of $SO_2$, and substantially free of hydrogen sulfide or carbonyl sulfide. It is also preferred to have the product gas contain less than 1–2 mole percent each of CO and $H_2$. Under optimum conditions, the product gas is composed substantially entirely of $SO_2$, $CO_2$, $H_2O$, and $N_2$.

Some of the features of the present invention are illustrated by the diagrammatic flow sheet of FIG. 1. A prepared anhydrite feed is shown being supplied through line 10, which may consist of a suitable feeding device such as a screw conveyor. The feed is introduced at one side into the lower portion of a reaction bed B of the single stage fluidized bed reactor 11. The bed is supported on a perforated plate 12, such as a porous or perforated ceramic plate. As shown, the air is introduced through a line 14 and the natural gas through line 15 into a distribution chamber 13 below the plate 12. However, the air and gas can be introduced separately into the bed B, as may be desirable where the air has been preheated to a temperature which would initiate combustion on mixing with the gas. It will be understood that a proportioned intermixing of the air and gas before or in the bed is desirable, and that a supply of air or the air-gas mixture should be supplied at a uniform rate across the full width of the porous plate 12. From what has been previously stated, it will be understood that the natural gas and air should not be burned (even partially) before entering the bed B. The volume of the air-gas mixture introduced into and passing through the bed B will maintain the finely divided calcium sulfate and the resulting reduced solid particles in a fluidized state. The bed is maintained at a reaction temperature, such as approximately 2,200° F., by the partial combustion, and at the same time the calcium sulfate is subjected to a reducing atmosphere containing the carbon monoxide and hydrogen. The basic reactions occurring within the bed B are believed to be as follows:

1. 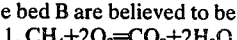 $CH_4 + 2O_2 = CO_2 + 2H_2O$
2. 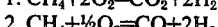 $CH_4 + \tfrac{1}{2}O_2 = CO + 2H_2$
3. 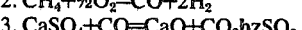 $CaSO_4 + CO = CaO + CO_2 bz SO_2$
4. 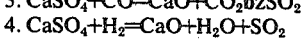 $CaSO_4 + H_2 = CaO + H_2O + SO_2$ Equation (1) represents the full combustion of the natural gas, using methane as the reference, since this will ordinarily be the major component of the natural gas. Equation (2) illustrates the partial combustion which produces the required quantities of carbon monoxide and hydrogen. These reducing agents then react with the calcium sulfate as represented by equations (3) and (4), the products being sulfur dioxide and lime with the oxidation of the reducing agent to either carbon dioxide or water. Since reactions (3) and (4) are highly endothermic, reactions (1) and (2) must supply sufficient heat to maintain the reaction temperature in a range of about 2,150°–2,250° F. As previously indicated, this means that the product gas from bed B will have the temperature of the reaction bed, and will thereby contain large amounts of sensible heat. One arrangement for a complete process is shown in FIG. 2.

Referring now to the FIG. 2 flowsheet, the prepared anhydrite is passed to storage in bin 100 from which it is dispensed to a weighing feeder 101, the weighed feed material being supplied to the preheating fluidized bed reactor 102 by the top inlet 103. The reactor is shown jacketed to indicated that it is insulated. The feed is first supplied to an upper bed P, which may be a fluidized bed, but is utilized for preheating and not for reaction. The bed P is supported on a base 104 which is provided with a plurality of upwardly extending passages. Beneath the bed P is the reactor bed R, which is also supported on a perforated base 105 having gas passages extending vertically therethrough. The supports or bases 104 and 105 can be formed of a suitable ceramic material, as is well known in the art.

Beneath the support 105 is a chamber 106 into which preheated air is introduced through line 107. The unburned natural gas (depending on the air temperature) can also be introduced into chamber 106, but to preclude preburning, it is shown as entering bed R through a line 108. In the bed R the gas is distributed and mixed with the air after the air passes through the support 105. As indicated by the arrows, the air or gas-air mixture flows upwardly through the bed support 105 and through the bed R, which consists of preheated calcium sulfate transferred from bed P, and in its upper portion of the component CaO. As indicated, the preheated calcium sulfate is transferred from the bed P to the bed R, and after a suitable residence time therein is converted to calcium oxide, which is removed through the line 109.

The product gas from bed R as indicated by the arrows, flows upwardly through the base 104 and through the bed P, where it is in direct heat exchange contact with the incoming calcium sulfate. The temperature maintained in the bed P is well below the reaction temperature, and preferably does not exceed 1,600° F. A suitable temperature range is about 1,500° to 1,600° F. Usually, it would be desirable to maintain a temperature in bed P of at least 1,400° F.

The gas product after heat transfer contact with the incoming feed in bed P is removed at 110 through a cyclone separator, a portion of the dust being returned to the bed P. The partially cooled gas is passed through line 111 to cyclone separators 112, 113 where the rest of the dust is removed. The substantially dust free gas is then passed to a counter current heat exchanger 114 where it is subjected to indirect countercurrent heat exchange contact with the combustion air which is supplied through a line 115 by a blower 116. Preferably, the air is heated in heat exchanger 114 to a temperature of at least 1,400° F. For reasons of equipment economy, it is preferred to limit the maximum temperature of the heated air to 1,500° F. or less. To maximize the advantages of the heat recovery system of the present invention, however, it will be desirable to heat the air in heat exchanger 114 to at least 1,300° F.

As indicated, the cooled product gas from heat exchanger 114 is passed to a plant for recovery of the sulfur dioxide, and this plant preferably also includes a conversion of the sulfur dioxide into sulfuric acid. Since these procedures are well known in the art and do not form a part of the present invention, they will not be described herein. As further indicated, the lime product after removal through the line 109 is passed to a cooler 117. The cooled lime product can be further processed, as is well known in the art of preparing calcium oxide products for commercial utilization. If the lime contains objectionable amounts of CaS or CaSO$_4$, special treatments can be utilized to reduce these components while increasing the CaO content, and if desired, recovering additional SO$_2$ containing gas.

A modification of the process is illustrated in FIG. 3. For convenience of reference, the same numbers are used, except that they are primed to indicate the modification.

In the illustration of FIG. 3, the preheating fluidized bed reactor 102' has been modified by the removal of the upper fluidized bed, which in the embodiment of FIG. 2 was utilized to preheat the calcium sulfate feed. As a substitute for the bed P, there is provided an insulated gas-solids contactor 200 providing a series of descending, alternating chutes or shelves 201, which cause the feed material to slide downwardly thereon and to be progressively transferred back and forth. On discharge from the lowermost shelf 201, the feed collects at the bottom of the contactor, as indicated in FIG. 3, and is transferred to reactor 102' through line 203 and inlet 103'. In contactor 200, the hot product gas flows over and around the descending solids in heat exchange relation therewith. The partially cooled gas is removed through line 111'. The feed F entering the contactor flows downwardly along 200 through inlet 204 and is brought into countercurrent contact with the product gas, which enters from reactor 102' through line 202. The feed is thereby preheated with the removal of part of the sensible heat of the product gas. With this arrangement, the amount of heat removed can be as much or greater than described in connection with the embodiment of FIG. 2. With this embodiment, the cooled gas can have a temperature below 1,600° F. and preferably below 1,500° F. Temperatures in the range of 1,400° to 1,600° F. can be used, such as 1,400° to 1,500° F. Instead of contactor 200, a moving bed solids-gas contactor, or a rotary kiln contactor can be used.

It will be understood that the cooled product gas in line 111' of FIG. 3 is preferably passed to a countercurrent heat exchanger such as the heat exchanger 114 described in connection with FIG. 2. In this heat exchanger, the air will be preheated for supply to chamber 106' through the line 107'. As shown, the gas fuel is injected from both sides of bed R'. While natural gas is the preferred fuel and reductant, it can be employed with a solid carbon fuel, such as coke charged with the CaSO$_4$ feed. It will be understood that the gas may contain other components than methane, such as ethane or other hydrocarbon gases.

This invention is further illustrated by the following specific examples.

EXAMPLE I

This test was carried out in a fluidized bed reactor which consists of a tubular section having an inside diameter of 10 inches. Gases were admitted through a porous ceramic plate at the bottom of the reactor and removed through a pipe which passed through the top closure. Solids were fed at a controlled rate by a feed screw which discharged at a point just above the gas distributor. Reacted solids were removed continuously through an overflow pipe, the top end of which was 31 inches above the bed support and/or gas distributor, Assuming that the top of the fluidized bed would have been even with the top of the overflow tube, the bed volume would have been 2,340 cu. in. All parts of the reactor which came in contact with the fluidized bed were constructed of refractory materials such as silicon carbide and castable alumina refractory. The temperature of the fluidized bed was determined by chromel-alumel thermocouples placed in silicon carbide thermowells which were inserted in the bed. Compressed air and natural gas were metered individually and mixed before reaching the gas distributor at the bottom of the reactor. The gas which issued from the top of the reactor was passed through a cyclone separator to remove most of the entrained solids and then passed through a water scrubber before being vented. Samples of the product gas were collected from a point between the cyclone separator and the scrubber for analysis by gas chromatography. In order to minimize heat losses, the sides and top of the reactor were surrounded by a concentric chamber which was heated by four gas burners. During operation some heat may have flowed from the outer chamber into the reactor but the amount was probably small.

A natural ore of calcium sulfate which had been crushed and screened to −8 +16 mesh size was fed to the reactor at a constant rate of 70 lb./hr. The material had the following approximate composition:

|  | Weight % |
| --- | --- |
| Anhydrite ($CaSO_4$) | 73.4 |
| Gypsum ($CaSO_4 \cdot 2H_2O$) | 24.4 |
| Calcium and magnesium carbonates | 0.6 |
| Insolubles and other materials | 1.6 |
|  | 100.00 |

Natural gas was fed to the reactor at a constant rate of 0.62 lb. moles/hr. and air at a rate of 4.5 lb. moles/hr. When steady-state operation was achieved after several hours of operation, the temperature of the fluidized bed was 2,150° F. and the pressure above the bed was slightly above atmospheric pressure. Under these conditions 20 lb./hr. of solids passed out the overflow tube, and 11 lb./hr, of solids were entrained in the gas issuing from the reactor. These solids were of the following average approximate composition:

|  | Weight % | |
| --- | --- | --- |
|  | Overflow | Entrained |
| $CaSO$ | 9.2 | 18.9 |
| $CaS$ | 2.2 | 15.9 |
| $CaO$ | 85.0 | 62.5 |
| Other | 3.6 | 2.7 |
|  | 100.0 | 100.0 |

At the same time the gases rising from the fluidized bed were found to have the following average composition after drying:

|  | mole % |
| --- | --- |
| $SO_2$ | 6.0 |
| $CO_2$ | 13.2 |
| $CO$ | 1.0 |
| $O_2$ | 1.8 |
| $N_2$ | 78.0 |
|  | 100.0 |

The solids which issued from the overflow pipe were 94 percent desulfurized while the entrained solids were 77 percent desulfurized. The yield of sulfur dioxide based on an analysis of the product gas was 59 percent while the indicated yield based on the sulfur removed from the solids was 87 percent. The latter is probably the more accurate figure, since difficulty was experienced in obtaining an accurate gas analysis. During the period of steady-state operation, the average residence time in the reactor of the solids issuing from the overflow pipe was estimated to be about 2 hr.

The results demonstrate the technical feasibility of a process for the partial combustion of natural gas and the simultaneous reaction of calcium sulfate with various reducing components in the system to produce a sulfur dioxide bearing gas, all within the same fluidized bed system.

EXAMPLE II

In a further extension of the process described in example I, the anhydrite-gypsum feed is preheated by direct countercurrent contact with the product gas from the fluidized bed. Various contacting devices can be utilized for this purpose, such as a rotary kiln. The feed is preheated to a temperature of 1,400° to 1,600° F., and the temperature of the product gas is correspondingly reduced. The partially cooled gas is then passed to a countercurrent indirect heat exchanger, where it is brought into heat transfer relation with the combustion air. The combustion air is heated to a temperature of 1,300°–1,500° F., and then mixed with the natural gas, the resulting mixture being burned in the fluidized bed, as described in example I. These improvements result in a substantial reduction in the amount of natural gas required to maintain the reaction temperature of the bed, and also in a substantial increase in the sulfur dioxide content of the product gas. For example, the amount of natural gas can be reduced from 35 to 45 percent, or higher; and the concentration of the sulfur dioxide in the product gas can be increased from 6 percent up to at least 8 percent, or greater.

EXAMPLE III

In the operation of a plant utilizing the flow sheet of FIG. 2, operating conditions can be established on the assumption that the natural gas is composed entirely of methane, and that it is supplied at 60° F. and 1 atmosphere. The air can also be assumed to be supplied to the blower at 60° F. and 1 atmosphere. The feed can be assumed to be prepared anhydrite having a mesh size of −6 to +65.

On the foregoing assumptions, the approximate operating conditions can be illustrated as follows:

The natural gas is supplied at the rate of 1,600 c.f.m., and the air at the rate of 9,740 c.f.m. The reaction bed of the fluidized reactor is maintained at a temperature of substantially 2,200° F. The incoming anhydrite feed is preheated in the upper bed to a temperature of about 1,565° F. The product gas from the reaction bed is thereby cooled to the same temperature, and after removal of the dust, is passed to the heat exchanger for contact with the incoming air. In this heat exchanger, the air is heated to about 1,410° F., and the product gas is cooled to about 800° F.

With the foregoing conditions, the plant can be operated at a feed capacity of 450 tons of anhydrite per day, and the resulting lime product will be about 175 tons per day. The optimum composition of the product gas can be approximated as:

| Component | Mole % |
| --- | --- |
| $SO_2$ | 12.5 |
| $CO_2$ | 10.5 |
| $H_2O$ | 21.1 |
| $N_2$ | 55.8 |
|  | 100.0 |

As compared with process operations where no heat is recovered from the product gas to preheat the feed, the amount of natural gas required for the process is reduced by about 45 percent, only 0.85 moles of methane ($CH_4$ basis) being required per mole of calcium sulfate, as compared with 1.52 moles of methane per mole of calcium sulfate where no heat is recovered. Further, the concentration of sulfur dioxide in the product gas can be increased by 90 percent, the concentration being 12.6 percent as compared with 6.6 percent. Further, since the total volume of gas handled is reduced by about 48 percent, the diameter of the fluidized bed reactor can be reduced by as much as 28 percent. Still another advantage is that the countercurrent gas-air heat exchanger can be operated with a maximum tube wall temperature of 1,500°

F., making possible the use of a conventional steel alloy, such as Type 446 stainless steel.

We claim:

1. In a continuous process of high temperature gaseous reduction of calcium sulfate to obtain a gas product containing recoverable $SO_2$ and a solid CaO product, the steps of providing a bed of finely divided calcium sulfate capable of being fluidized, flowing proportioned air and natural gas into said bed to maintain it in a fluidized state, partially burning said natural gas within said bed to heat said bed to a temperature of substantially 2,150° to 2,250° F. and to produce reducing quantities of CO and $H_2$, said air providing from about 1.3 to 1.8 moles of $O_2$ per mole of C in said natural gas.

2. The process of claim 1 in which all of the burning of said natural gas occurs within said bed and the said calcium sulfate in said bed is subjected only to the reducing action of the resulting CO and $H_2$.

3. The process of claim 1 in which said gas product from said bed is directly contacted with a calcium sulfate feed to said bed to preheat said feed and remove part of the heat from said gas product.

4. The process of claim 1 in which said gas product from said bed is subjected to indirect countercurrent heat exchange contact with air supplied to said bed before said air is mixed with said natural gas, thereby preheating said air and removing part of the heat from said gas product.

5. The process of claim 4 in which said preheated air is mixed with said natural gas without igniting said natural gas before the said natural gas and air are introduced into bed.

6. The process of claim 1 in which said gas product from said bed is directly contacted with a calcium sulfate feed to said bed to preheat said feed and remove part of the sensible heat from said gas product, and in combination therewith the said gas product after said partial heat removal is subjected to indirect countercurrent heat exchange contact with the air supplied to said bed, thereby preheating said air and removing more of the sensible heat from said gas product.

7. The process of claim 6 in which said preheated air is mixed with said natural gas without igniting said natural gas before its admixture with said air is introduced into said bed.

8. In a process of high temperature gaseous reduction of calcium sulfate in a fluidized bed reactor to obtain a product gas containing recoverable $SO_2$ and a CaO product, the steps of feeding preheated finely divided calcium sulfate to the fluidized bed of said reactor, said calcium sulfate feed being preheated by directly contacting it with said hot product gas, thereby recovering part of the sensible heat from said product gas, thereafter indirectly contacting said product gas with a stream of air to recover more of the sensible heat from said product gas, passing the resulting heated air and a supply of natural gas to said fluidized bed reactor, and partially burning said natural gas with said heated air to provide heat and reducing gas for said gaseous reduction.

9. The process of claim 8 wherein said calcium sulfate feed is preheated in a fluidized bed by passing said product gas therethrough, and the preheated feed is transferred to the fluidized bed of said reactor for said gaseous reduction.

10. The process of claim 8 in which said calcium sulfate feed is caused to flow along a tortuous path in direct countercurrent contact with said gas product.

11. The process of claim 8 in which said fluidized bed is maintained at a temperature of substantially 2,150° to 2,250° F., said calcium sulfate feed is preheated to a temperature of at least 1,500° F., said air is heated to a temperature of at least 1,400° F., and said product gas as a result of both said heat recovery steps has its temperature reduced to at least 900° F.